United States Patent
Kim et al.

(10) Patent No.: US 10,087,965 B2
(45) Date of Patent: Oct. 2, 2018

(54) SOLAR CELL PANEL AND MOUNTING STRUCTURE THEREOF

(71) Applicant: LG ELECTRONICS INC., Seoul (KR)

(72) Inventors: Jeongshik Kim, Seoul (KR); Hyunrok Mun, Seoul (KR); Junoh Shin, Seoul (KR); Hwanyeon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 286 days.

(21) Appl. No.: 13/658,440

(22) Filed: Oct. 23, 2012

(65) Prior Publication Data

US 2013/0269757 A1 Oct. 17, 2013

(30) Foreign Application Priority Data

Apr. 17, 2012 (KR) .................. 10-2012-0039933

(51) Int. Cl.
| | |
|---|---|
| *H01L 31/042* | (2014.01) |
| *F16B 5/02* | (2006.01) |
| *F24J 2/52* | (2006.01) |
| *H02S 30/10* | (2014.01) |
| *F16B 37/06* | (2006.01) |
| *F24J 2/46* | (2006.01) |

(52) U.S. Cl.
CPC ........... *F16B 5/0233* (2013.01); *F24J 2/5211* (2013.01); *H02S 30/10* (2014.12); *F16B 37/065* (2013.01);
(Continued)

(58) Field of Classification Search
CPC .............................. H01L 31/048; F24J 2/5211; F24J 2002/4674; F24J 2002/4669; H02S 30/10;
(Continued)

(56) References Cited

U.S. PATENT DOCUMENTS 2,170,472 A * 8/1939 Fitch ................................ 29/509
2,415,695 A * 2/1947 Cann ..................... B23P 19/062
29/512
(Continued)

FOREIGN PATENT DOCUMENTS

JP 2001074024 * 9/1999 ............. H01L 31/00
JP 2003-56147 A 2/2003
(Continued)

OTHER PUBLICATIONS

JP2001074024—English translation.*

*Primary Examiner* — Uyen M Tran
(74) *Attorney, Agent, or Firm* — Birch, Stewart, Kolasch & Birch, LLP

(57) ABSTRACT

A solar cell panel according to an embodiment of the invention includes a solar cell module, a frame including a module coupler coupled with a peripheral edge of the solar cell module and a leg which is connected to the module coupler and includes a plurality of holes, and a plurality of nut members fixed to the leg of frame, each of the plurality of nut members including a bolt insertion hole. Each of the plurality of nut members includes a head, a rivet connected to the head, and a fixer positioned at one end of the rivet. The head is positioned on a first surface of the leg, and the fixer is positioned on a second surface opposite the first surface of the leg. The rivet is inserted into each of the plurality of holes of the leg.

8 Claims, 4 Drawing Sheets

(52) U.S. Cl.
CPC .......................... *F24J 2002/4669* (2013.01); *F24J 2002/4674* (2013.01); *Y02B 10/12* (2013.01); *Y02E 10/47* (2013.01)

(58) Field of Classification Search
CPC ...... F16B 5/0233; F16B 37/065; Y02B 10/12; Y02E 10/47
See application file for complete search history.

(56) References Cited

U.S. PATENT DOCUMENTS

| | | | |
|---|---|---|---|
| 3,825,407 A * | 7/1974 | Fujite | H05B 3/00 219/216 |
| 5,692,786 A * | 12/1997 | Berger | E05B 17/22 292/251.5 |
| 2010/0212723 A1* | 8/2010 | Furukawa | 136/251 |
| 2010/0294340 A1* | 11/2010 | Cunningham | F24J 2/4614 136/251 |
| 2011/0232728 A1* | 9/2011 | Mun | 136/251 |
| 2011/0239546 A1 | 10/2011 | Tsuzuki et al. | |

FOREIGN PATENT DOCUMENTS

| | | |
|---|---|---|
| JP | 2003-78154 A | 3/2003 |
| JP | 2011-014877 A | 1/2011 |
| KR | 10-1079257 B1 | 11/2011 |
| KR | 10-1085215 B1 | 11/2011 |
| WO | WO 2010/065614 A1 | 6/2010 |

\* cited by examiner

SOLAR CELL PANEL AND MOUNTING STRUCTURE THEREOF

This application claims priority to and the benefit of Korean Patent Application No. 10-2012-0039933 filed in the Korean Intellectual Property Office on Apr. 17, 2012, the entire contents of which are incorporated herein by reference.

BACKGROUND OF THE INVENTION

Field of the Invention

Embodiments of the invention relate to a solar cell panel and a mounting structure thereof and, more particularly, to a solar cell panel and a mounting structure thereof capable of simply carrying out a mounting work.

Description of the Related Art

Recently, as existing energy sources such as petroleum and coal are expected to be depleted, interests in alternative energy sources for replacing the existing energy sources are increasing. Among the alternative energy sources, solar cells for generating electric energy from solar energy have been particularly spotlighted.

A solar cell generally includes a substrate and an emitter region, which are formed of semiconductors of different conductive types, for example, a p-type and an n-type, and electrodes respectively connected to the substrate and the emitter region. A p-n junction is formed at an interface between the substrate and the emitter region.

When light is incident on the solar cell having the above-described structure, electrons inside the semiconductors become free electrons (hereinafter referred to as 'electrons') by the photoelectric effect. Further, electrons and holes respectively move to the n-type semiconductor (for example, the emitter region) and the p-type semiconductor (for example, the substrate) based on the principle of p-n junction. The electrons moving to the emitter region and the holes moving to the substrate are collected by the electrode connected to the emitter region and the electrode connected to the substrate, respectively.

Because the solar cell having the above-described structure produces a very small voltage and current, the plurality of solar cells are connected in series or parallel to one another so as to obtain a desired output. Hence, a moisture-proof solar cell module including the plurality of solar cells is manufactured.

A solar cell panel includes the solar cell module and a frame surrounding the solar cell module. The solar cell panel is mounted on a mounting stand installed on the roof or the outer wall of the building or on the ground.

SUMMARY OF THE INVENTION

In one aspect, there is a solar cell panel including a solar cell module, a frame including a module coupler coupled with a peripheral edge of the solar cell module and a leg connected to the module coupler, the leg including a plurality of holes, and a plurality of nut members fixed to the leg of frame, each of the plurality of nut members including a bolt insertion hole, wherein each of the plurality of nut members further includes a rivet which is inserted into respective each of the plurality of holes of the leg.

Each of the plurality of nut members further includes a head positioned at one end of the rivet and a fixer positioned at the other end of the rivet. The head is positioned on a first surface of the leg, and the fixer is positioned on a second surface opposite the first surface of the leg.

A thickness of the fixer is equal to or less than a thickness of the rivet. A size of the fixer is greater than a size of each hole of the leg.

A length of the leg is equal to or less than about 30 mm, preferably, equal to or less than about 20 mm.

The module coupler includes a front coupler positioned on a front surface of the solar cell module, a back coupler positioned on a back surface of the solar cell module, and a side coupler which is positioned on a side of the solar cell module and connects the front coupler to the back coupler.

The leg includes a first leg positioned parallel to the side coupler and a second leg positioned in a direction perpendicular to the first leg. The plurality of holes of the leg are formed in the second leg.

The solar cell panel having the above-described configuration is fixed to a mounting stand by coupling a plurality of bolts with the nut members.

A washer may be integrally fixed to each of the plurality of bolts. In a mounting structure of the solar cell panel, the fixer of each of the plurality of nut members is positioned between the leg and the mounting stand. Further, a size of the fixer may be greater than a size of each of a plurality of holes of the mounting stand. Alternatively, a size of each of the plurality of holes of the mounting stand may be equal to or greater than a size of the fixer.

According to the above-described characteristics, the nut member is fixed to the frame in a state where the rivet is inserted into the hole of the second leg of the frame.

Thus, the nut member including the rivet may be easily fixed to the frame, as compared to when the nut member including only the head is weld-fixed to the leg.

When the solar cell panel is mounted on the mounting stand, a worker may simply and easily finish the mounting work of the solar cell panel by coupling the bolts with the nut members in a state where the bolt insertion holes of the nut members are aligned with the holes of the mounting stand.

As described above, because the nut members each including the rivet are integrally fixed to the frame of the solar cell panel according to an embodiment of the invention, the worker does not need to put his or her finger into the leg of the frame so as to fix the nut members. Namely, the worker does not need to fix the nut members using his/her finger.

Accordingly, a length of the leg of the frame may decrease compared to the related art. For example, in the related art solar cell panel, in which the worker has to put his/her finger into the leg of the frame so as to fix the nut members, and in the related art solar cell panel, in which the nut members each including only the head are weld-fixed to the leg, a length of the second leg was about 35 mm to 55 mm, so as to secure a work space or a welding space.

However, in the embodiment of the invention, even when the length of the leg is equal to or less than about 30 mm, preferably, equal to or less than about 20 mm, the solar cell panel may be mounted on the mounting stand. Hence, an amount of material used in the frame may decrease by a reduction in the length of the leg, and thus, the manufacturing cost of the frame may be reduced.

Because the worker does not need to put his/her finger into the leg of the frame so as to fix the nut members, time required to couple the bolts with the nut members may be reduced. Further, the missing of the nut member from his/her finger in the mounting work may be prevented.

Because the head and the fixer of the nut member are respectively positioned on the first and second surfaces of the leg of the frame, the release of the nut member resulting from the vibration may be prevented.

Because the bolt includes the washer which is formed in the integral form of the bolt, the mounting work of the solar cell panel may be more easily carried out.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
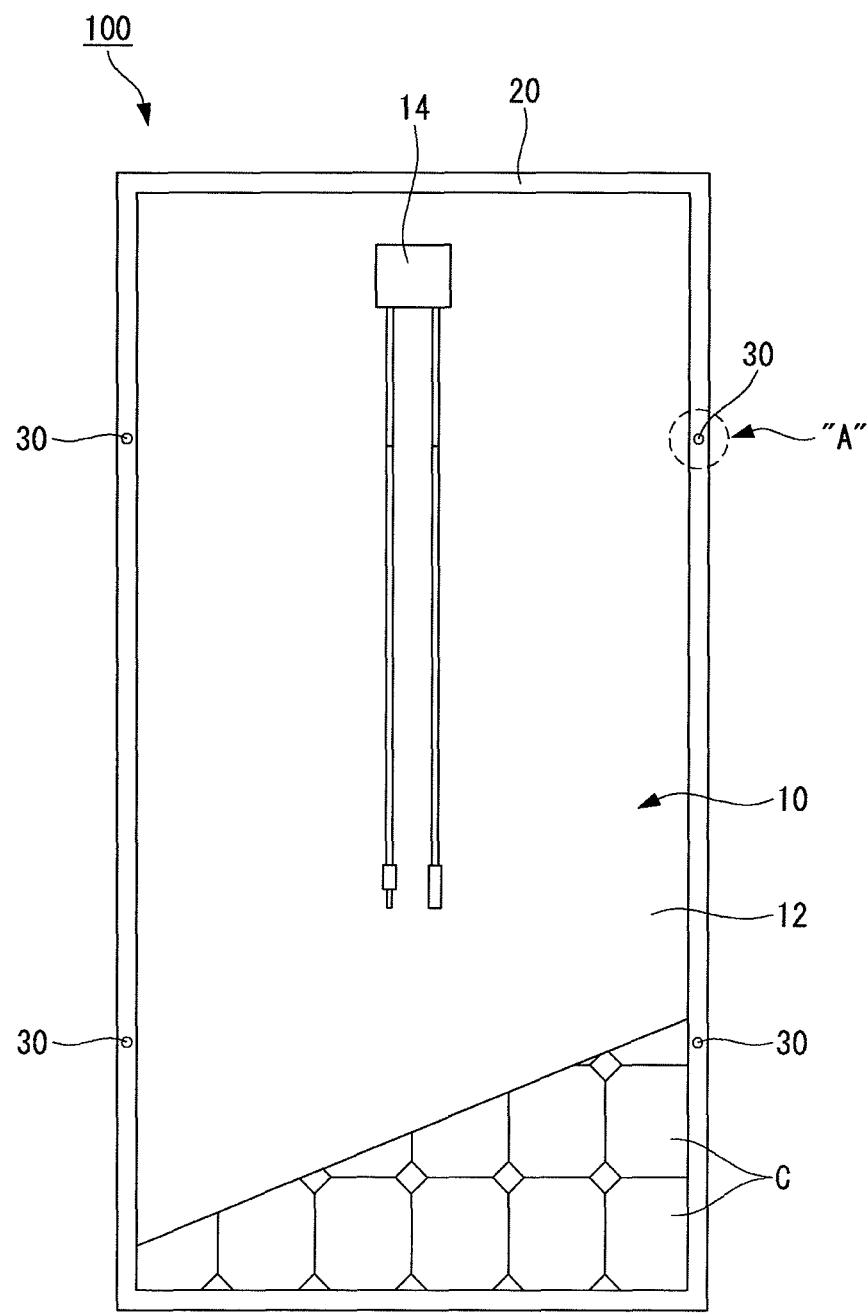
FIG. 1 is a back view of a solar cell panel according to an example embodiment of the invention.

Reference will now be made in detail to embodiments of the invention, examples of which are illustrated in the accompanying drawings. This invention may, however, be embodied in many different forms and should not be construed as limited to the embodiments set forth herein. Wherever possible, the same reference numbers will be used throughout the drawings to refer to the same or like parts. A detailed description of known arts will be omitted if it is determined that the known arts can obscure the embodiments of the invention.

In the drawings, the thickness of layers, films, panels, regions, etc., are exaggerated for clarity. When an element such as a layer, film, region, or substrate is referred to as being "on" another element, it can be directly on the other element or intervening elements may also be present.

In contrast, when an element is referred to as being "directly on" another element, there are no intervening elements present. Further, when an element such as a layer, film, region, or substrate is referred to as being "entirely" on other element, it may be on the entire surface of the other element and may not be on a portion of an edge of the other element.

Example embodiments of the invention will be described with reference to FIGS. 1 to 5.

Figure 2:
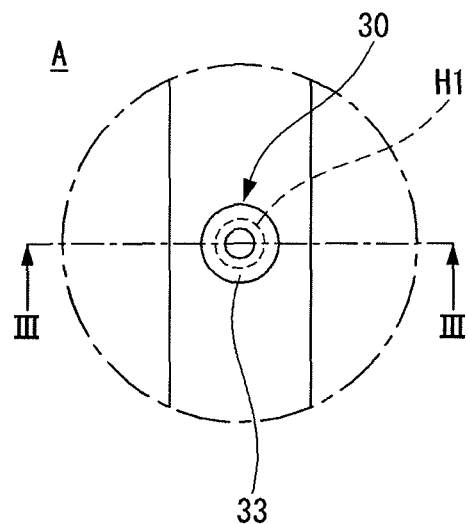
FIG. 2 is an enlarged view enlarging a portion 'A' of FIG. 1.
Figure 3:
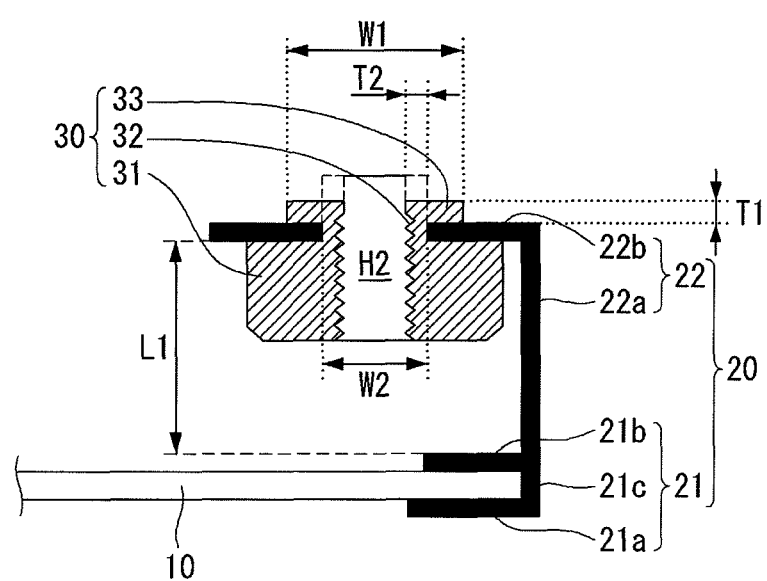
FIG. 3 is a partial cross-sectional view taken along line III-III of FIG. 2.

FIG. 1 is a back view of a solar cell panel according to an example embodiment of the invention. FIG. 2 is an enlarged view enlarging a portion 'A' of FIG. 1. FIG. 3 is a partial cross-sectional view taken along line III-III of FIG. 2.

A solar cell panel 100 according to an example embodiment of the invention includes a solar cell module 10 and a frame 20 coupled with a peripheral edge of the solar cell panel 100.

The solar cell module 10 includes a plurality of solar cells C, interconnectors for electrically connecting the plurality of solar cells C, a front protective layer and a back protective layer for protecting the plurality of solar cells C, a transparent substrate positioned on the front protective layer, and a back sheet 12 positioned on a back surface of the back protective layer. The above components form an integral body through a lamination process.

The back sheet 12 prevents moisture and oxygen from penetrating into a back surface of the solar cell module 10, thereby protecting the solar cells C from an external environment. The back sheet 12 may have a multi-layered structure including a moisture/oxygen penetrating prevention layer, a chemical corrosion prevention layer, an insulation layer, etc.

The front protective layer and the back protective layer are respectively positioned on and under the solar cells C and are attached to each other through the lamination process, thereby forming an integral body along with the solar cells C. Hence, the front protective layer and the back protective layer prevent corrosion of the solar cells C resulting from the moisture penetration, and protect the solar cells C from an impact. The front protective layer and the back protective layer may be formed of the same material, for example, ethylene vinyl acetate (EVA).

The transparent substrate positioned on the front protective layer is formed of a tempered glass having a high transmittance of light and a damage prevention function. The tempered glass may be a low iron tempered glass containing a small amount of iron. The transparent substrate may have an embossed inner surface so as to increase a scattering effect of light.

In the embodiment of the invention, each of the plurality of solar cells C may be one of a bulk solar cell using a silicon wafer and a thin film solar cell using a silicon thin film. Alternatively, each solar cell C may be a compound solar cell.

As described above, the solar cells C included in the solar cell module 10 according to the embodiment of the invention are not particularly limited in material and structure. Each of the solar cells C may be formed of various materials and may have various structures.

A junction box 14 is positioned on a back surface of the back sheet 12 to collect electric current produced by the plurality of solar cells C, which are connected in series or parallel to one another.

The frame 20 includes a module coupler 21 coupled with a peripheral edge of the solar cell module 10 and a leg 22 connected to the module coupler 21.

In the embodiment of the invention, the module coupler 21 includes a front coupler 21a positioned on a front surface (i.e., positioned on the transparent substrate) of the solar cell module 10, a back coupler 21b positioned on a back surface (i.e., positioned on the back sheet 12) of the solar cell module 10, and a side coupler 21c which is positioned on the side of the solar cell module 10 and connects the front coupler 21a to the back coupler 21b.

The leg 22 includes a first leg 22a positioned parallel to the side coupler 21c and a second leg 22b positioned in a direction perpendicular to the first leg 22a. The second leg 22b has a plurality of holes H1.

The solar cell module 10 further includes a plurality of nut members 30 which are respectively inserted into the holes H1 of the second leg 22b and are fixed to the holes H1.

Each of the plurality of nut members 30 includes a head 31, a rivet 32 connected to the head 31, and a fixer 33 positioned at one end of the rivet 32. The head 31 is positioned on a first surface (a surface facing the solar cell module 10 in the embodiment of the invention) of the second leg 22b. The fixer 33 is positioned on a second surface opposite the first surface of the second leg 22b. The rivet 32 is inserted into the hole H1 of the second leg 22b.

The fixer 33 is formed by pressing a protruding portion of the rivet 32 (shown in outline using broken lines) to the second surface of the second leg 22b. Once pressed, the fixer 33 and the head 31 pinch the second leg 22b from opposite sides. A thickness T1 of the fixer 33 is equal to or less than a thickness T2 of the rivet 32. A size (or a diameter) W1 of the fixer 33 is greater than a size W2 of each of the holes H1.

Accordingly, the nut member 30 is fixed to the second leg 22b of the frame 20 by the fixer 33 and the head 31 in a state where the rivet 32 is inserted into the hole H1 of the second leg 22b.

Each of the nut members 30 further includes a bolt insertion hole H2. Namely, each of the nut members 30 includes the bolt insertion hole H2 passing through the head 31, the rivet 32, and the fixer 33.

In the solar cell panel 100 having the above-described configuration, the nut members 30 are fixed to the second leg 22b of the frame 20 in a state where the rivets 32 of the nut members 30 are inserted into the holes H1 of the second leg 22b of the frame 20.

Accordingly, when the solar cell panel 100 is mounted on a mounting stand, a worker does not need to put his or her finger into the leg 22 of the frame 20 so as to fix the nut members 30. Namely, the worker does not need to fix the nut members 30 using his/her finger.

Accordingly, a length of the leg 22 of the frame 20 may decrease compared to the related art. For example, in a related art solar cell panel, in which the worker has to put his/her finger into the leg of the frame so as to fix the nut members, a length of the first leg was about 35 mm to 55 mm.

However, in the embodiment of the invention, even when a length L1 of the first leg 22a is equal to or less than about 30 mm, preferably, equal to or less than about 20 mm, the solar cell panel 100 may be mounted on the mounting stand.

In the embodiment of the invention, a length L1 of the first leg 22a ranges from the first surface of the second leg 22b to a second surface (i.e., a surface facing the second leg 22b) of the back coupler 21b.

Hence, an amount of material used in the frame 20 may decrease by a reduction in the length L1 of the second leg 22b, and thus, the manufacturing cost of the frame 20 may be reduced.

A support member for elastically supporting the solar cell module 10 may be positioned between the module coupler 21 of the frame 20 and the solar cell module 10.

The support member may have a substantially U-shape. The support member may include a front supporter positioned between the front surface of the solar cell module 10 and the front coupler 21a of the module coupler 21, a back supporter positioned between the back surface of the solar cell module 10 and the back coupler 21b of the module coupler 21, and a side supporter positioned between the side of the solar cell module 10 and the side coupler 21c of the module coupler 21.

A mounting structure of the solar cell panel according to the embodiment of the invention is described below with reference to FIGS. 4 and 5.

Figure 4:
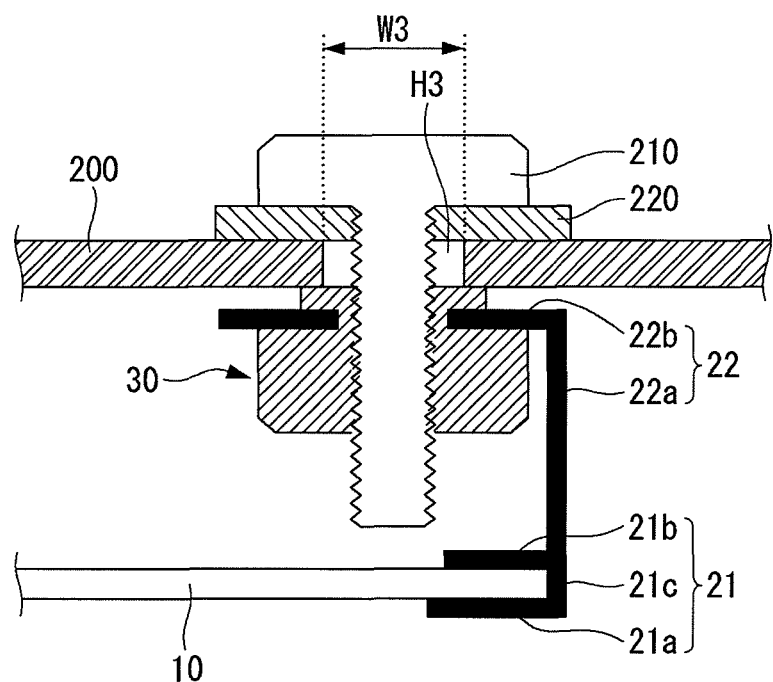
FIG. 4 is a cross-sectional view showing a mounting structure of a solar cell panel according to an example embodiment of the invention.

FIG. 4 is a cross-sectional view showing a mounting structure of the solar cell panel according to the embodiment of the invention. FIG. 5 is a cross-sectional view showing a mounting structure of a solar cell panel according to another example embodiment of the invention.

The solar cell panel 100 having the above-described configuration may be mounted on a mounting stand 200 by inserting and fastening a bolt 210 into the bolt insertion hole H2 of each nut member 30.

For this, the mounting stand 200 has a plurality of holes H3, into which the bolts 210 are respectively inserted. The solar cell panel 100 is mounted on the mounting stand 200 by coupling the bolts 210 with the nut members 30 in a state where the bolt insertion holes H2 of the nut members 30 are aligned with the holes H3 of the mounting stand 200.

The fixer 33 of each nut member 30 is positioned between the second leg 22b and the mounting stand 200. The bolts 210 are coupled with the nut members 30 in a space under the mounting stand 200.

The bolt 210 may include a washer 220, which is formed in an integral form of the bolt 210 and prevents the release of the bolt 210. In this instance, the washer 220 may be welded and fixed under a head of the bolt 210.

As shown in FIG. 4, a size (or a diameter) W3 of each of the holes H3 of the mounting stand 200 may be less than the size (or the diameter) W1 of the fixer 33 of each nut member 30. Alternatively, as shown in FIG. 5, the size (or the diameter) W3 of each of the holes H3 of the mounting stand 200 may be equal to or greater than the size (or the diameter) W1 of the fixer 33 of each nut member 30, so as to efficiently carry out an alignment work between the solar cell panel 100 and the mounting stand 200 when the solar cell panel 100 is aligned with the mounting stand 200.

As shown in FIG. 4, when the size W3 of each hole H3 of the mounting stand 200 is less than the size W1 of the fixer 33 of each nut member 30, there may be contact between fixer 33 and the mounting stand 200, and there may be no contact between the second leg 22b and the mounting stand 200.

Figure 5:
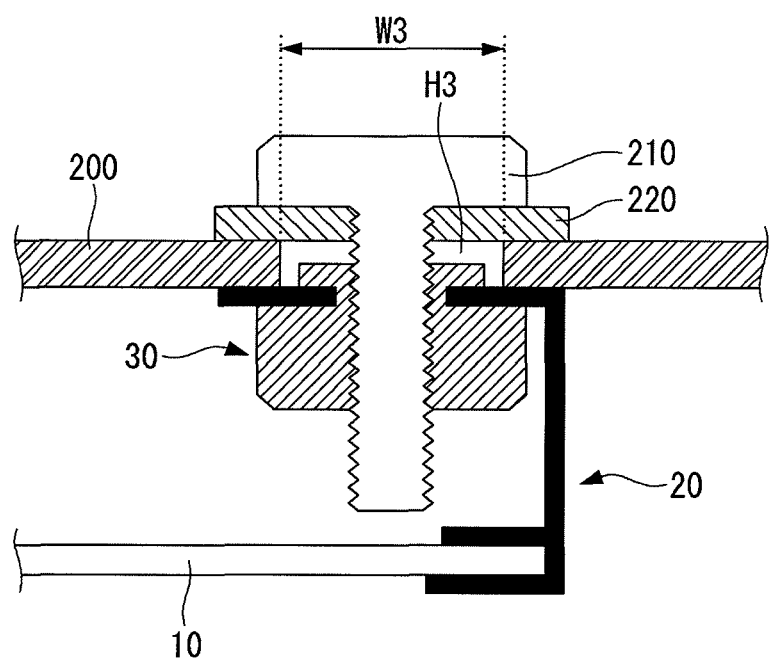
FIG. 5 is a cross-sectional view showing a mounting structure of a solar cell panel according to another example embodiment of the invention.

As shown in FIG. 5, when the size W3 of each hole H3 of the mounting stand 200 is equal to or greater than the size W1 of the fixer 33 of each nut member 30, the alignment work between the solar cell panel 100 and the mounting stand 200 may be simply completed by inserting the fixer 33 of the nut member 30 into the hole H3 of the mounting stand 200. Thus, the convenience of the mounting work of the solar cell panel 100 is further improved. In this embodiment of the invention, there may be no contact between fixer 33 and the mounting stand 200, and there may be contact between the second leg 22b and the mounting stand 200.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An installation apparatus for a solar cell panel, the installation apparatus comprising:
    a module coupler for coupling with a peripheral edge of a solar cell module;
    a leg connected to the module coupler and including a first leg which is perpendicular to the solar cell module and a second leg which is parallel to the solar cell module, the second leg including a plurality of holes;
    a plurality of nut members fixed to the second leg; and
    a mounting stand fixed to the second leg parallel to the solar cell module,
    wherein the each of the plurality of nut members is formed of one body and includes a bolt insertion hole, wherein the each of the plurality of nut members includes a rivet which is inserted into respective each of the plurality of holes of the second leg, a head positioned at one end of the rivet and a fixer positioned at the other end of the rivet, wherein a threading is positioned inside the bolt insertion hole at the rivet, wherein the head is positioned on a first surface of the second leg, the first surface of the second leg being one to face the solar cell module, wherein the threading is extended from the fixer to the head, wherein a length from the second leg to the module coupler is equal to or less than about 20 mm, wherein the mounting stand has a plurality of holes aligned with the bolt insertion holes of the plurality of nut members, wherein the solar cell panel is mounted on the mounting stand by fastening a plurality of bolts with each of the plurality of nut members, wherein a width of the fixer is smaller than a width of the head, wherein the second leg has a first surface facing toward the solar cell module and a second surface opposite to the first surface, wherein the head of each nut member among the plurality of numbers is disposed directly on and in contact with the first surface of the second leg and the first surface of the second leg is an inner surface of the frame facing toward the solar cell module, and the fixer of each nut member among the plurality of numbers is disposed directly on and in contact with the second surface of the second leg and the second surface of the second leg is an outer surface of the frame facing away from the solar cell module, wherein the plurality of bolts are fastened from the mounting stand to the each of the plurality of nut members, wherein the mounting stand disposed to face the second surface of the second leg, and wherein the fixer of each nut member among the plurality of numbers is disposed between the mounting stand and the second leg of the frame, an upper surface of the fixer faces away from the solar cell module and directly contacts the mounting stand, and a lower surface of the fixer faces toward the solar cell module and directly contacts the second surface of the second leg of the frame.

2. The installation apparatus for the solar cell panel of claim 1, wherein the fixer is formed by pressing the rivet that is protruding on to the second surface of the second leg.

3. The installation apparatus for the solar cell panel of claim 1, wherein a size of the fixer is greater than the size of each hole of the second leg.

4. The installation apparatus for the solar cell panel of claim 1, wherein the module coupler includes a front coupler for positioning on a front surface of the solar cell module, a back coupler for positioning on a back surface of the solar cell module, and a side coupler for positioning on a side of the solar cell module and connecting the front coupler to the back coupler.

5. The installation apparatus for the solar cell panel of claim 1, wherein the threading is formed entirely in the inside of the bolt insertion hole.

6. The installation apparatus for the solar cell panel of claim 1, wherein the size of each of the bolt insertion hole is the same for the rivet, the head, and the fixer of each nut.

7. The installation apparatus for the solar cell panel of claim 1, wherein the plurality of bolts include a washer welded under each of heads of the plurality of bolts.

8. The installation apparatus for the solar cell panel of claim 1, wherein a size of each of the plurality of holes of the mounting stand is greater than a size of the fixer of each of the plurality of nut members.

* * * * *